April 15, 1924.

A. J. BILLOWS 1,490,727

APPARATUS FOR AERATING LIQUIDS

Filed Aug. 31, 1921

5 Sheets-Sheet 1

Inventor
A. J. Billows
Per
Herbert Slick Atty.

April 15, 1924.

A. J. BILLOWS 1,490,727

APPARATUS FOR AERATING LIQUIDS

Filed Aug. 31, 1921    3 Sheets-Sheet 3

Inventor
A. J. Billows
per
Hubert E. Peck Atty.

April 15, 1924.

A. J. BILLOWS 1,490,727

APPARATUS FOR AERATING LIQUIDS

Filed Aug. 31, 1921

5 Sheets-Sheet 4

Inventor
a. J. Billows

April 15, 1924.

A. J. BILLOWS 1,490,727

APPARATUS FOR AERATING LIQUIDS

Filed Aug. 31, 1921    5 Sheets-Sheet 5

Inventor
A. J. Billows
per
Hubert Peck Atty.

Patented Apr. 15, 1924.

1,490,727

UNITED STATES PATENT OFFICE.

ARTHUR J. BILLOWS, OF LONDON, ENGLAND.

APPARATUS FOR AERATING LIQUIDS.

Application filed August 31, 1921. Serial No. 497,443.

*To all whom it may concern:*

Be it known that I, ARTHUR JAMES BILLOWS, a subject of the King of Great Britain and Ireland, and resident of London, England, have invented new and useful Improvements in Apparatus for Aerating Liquids, of which the following is a specification.

This invention of improvements in apparatus for aerating liquids has relation to apparatus of the kind in which the liquid is aerated in a stationary aerating chamber into which gas and liquid are introduced separately and in proportionate quantities, and the invention, which has for its object to provide improvements in apparatus of the kind referred to, is characterized by the fact that the aerated liquid is cooled by the expansion of a gas which is subsequently employed to aerate the liquid.

Apparatus for aerating liquid of the kind referred to and in accordance with this invention, comprises the combination with a stationary chamber into which gas and liquid are introduced separately and simultaneously and in which aeration is effected, and aerated liquid delivery means, of a combined storage and cooling chamber comprising a closed chamber interposed between the delivery means and the aerating chamber and containing a coil in connection at its ends with a gas container and with the aerating chamber, the gas passing through the coil undergoing expansion and cooling the aerated liquid in the closed chamber prior to its entry into and aeration of liquid in the aerating chamber.

Also in accordance with this invention, and in combination with apparatus as set forth in the preceding paragraph, there is a secondary storage chamber comprising a closed vessel in connection with the combined storage and cooling chamber and having gas and liquid outlets, each controlled by a separate and independently operated valve.

Referring now to the accompanying drawings:—

Figure 1:
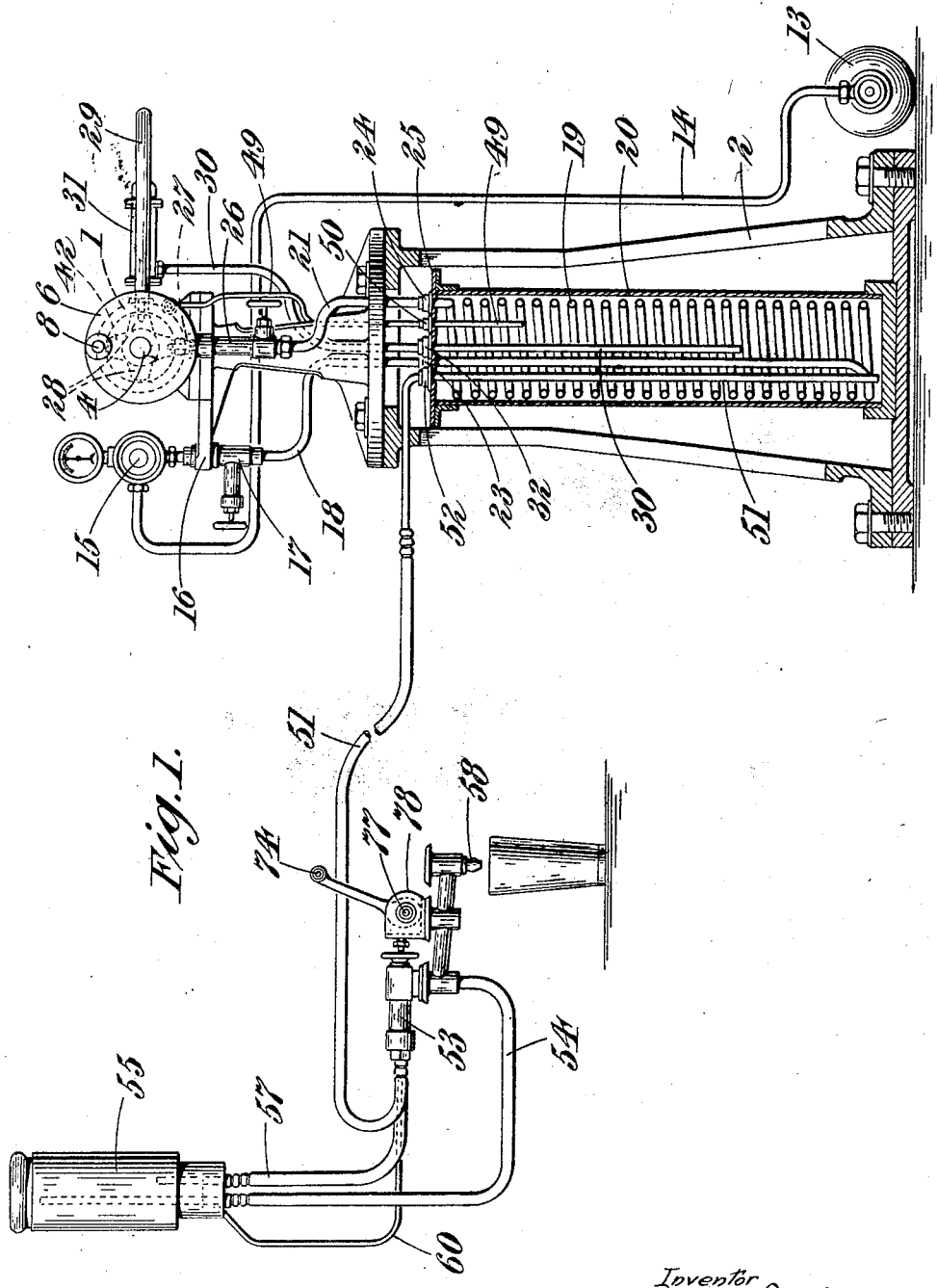
Figure 2:
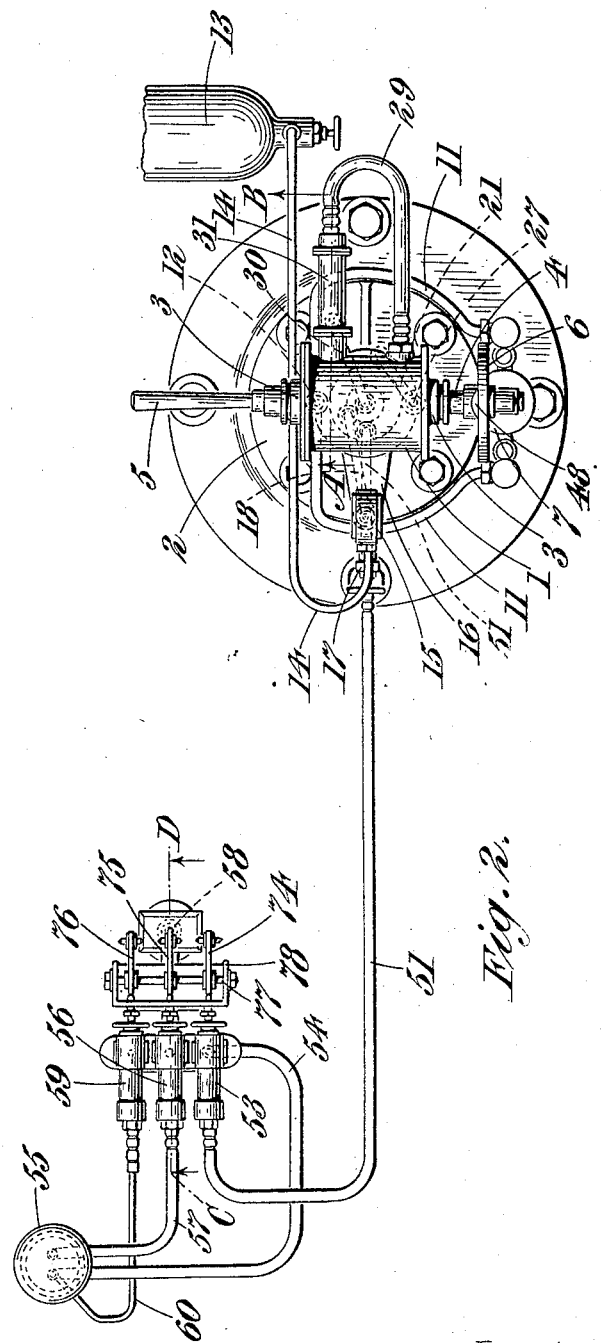

Fig. 1 is an elevational view, partly in section;

Fig. 2 a plan view; and

Figure 3:
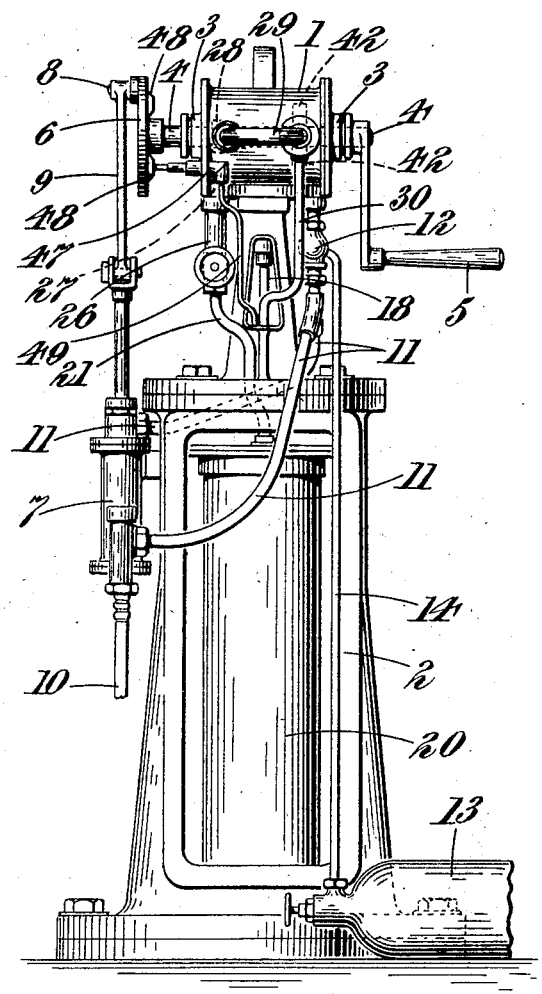

Fig. 3 an end elevation of a complete apparatus for aerating liquid and provided with a draught arm delivery device.

Figure 5:
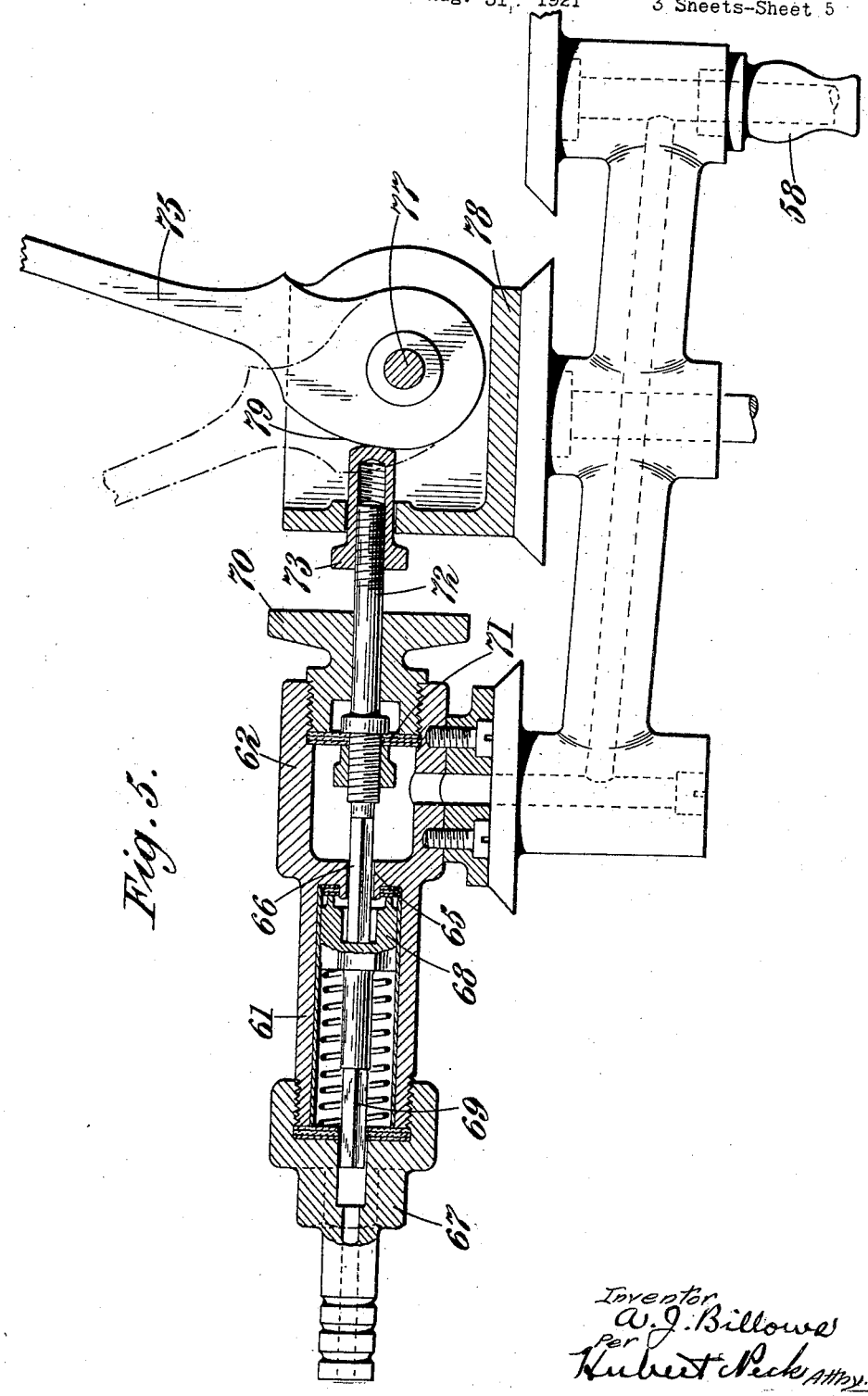

Figs. 4 and 5 are sections on the line A—B and C—D, respectively, of Fig. 2.

1 is the stationary and cylindrical aerating chamber mounted on a standard 2 that is fixed to the floor. The standard 2 serves, at its upper part, as a carrier for other parts of the apparatus, and its lower part, which can be closed in by removable panels, constitutes a closed compartment to receive other parts of the apparatus. The aerating chamber is closed at both ends by closures, one or both of which is removable. Each end closure has a stuffing box and gland 3, which also serves as a bearing for a shaft 4, that extends at both ends beyond the stuffing boxes. On one end of the shaft 4 is mounted a handle 5 by which the shaft may be rotated manually and on the other end a crank disc 6. In some cases it may be desired to drive the shaft mechanically, in which case, the handle 5 is dispensed with and the shaft is coupled, directly or indirectly, to the prime mover.

7 is a pump, preferably of the reciprocatory and double acting type, mounted on the standard 2 below, and in line with, the shaft 4. The pump plunger is connected by the connecting rod 9 with a pin 8 on the crank disc 6. The stroke of the pump 7 may be increased or decreased by alteration of the position of the pin 8 on the crank disc 6, and consequently, the volume of liquid delivered at each stroke varied. 10 is one of the suction pipes (there are two) and 11, 11 are the delivery pipes of the pump 7. The delivery pipes 11, 11 are coupled together by a fitting 12 which contains a non-return valve and is mounted on, and opens into, the lower part of the aerating chamber 1.

13 is a container in which gas for the aeration of liquid is stored under considerable pressure. The gas container 13 is connected by a pipe 14 with one side of a pressure reducing valve 15, carried by a bracket 16 mounted on the standard 2. The other side of the pressure reducing valve 15 is connected through the casing of a screw down valve 17 with a pipe 18 that is integral with, and constitutes an extension of, one end of a coil 19 contained within a chamber 20. The chamber 20 is situated within the lower part of the standard 2 and constitutes the combined storage and cooling chamber. The coil 19 is connected at its other end with the lower part of the aerating chamber 1 through a pipe 21, also integral with, and constituting an extension of, the coil 19. The two coil extensions 18, 21 pass, by means of glands 23, 24, respectively, through the closure 25 of the storage chamber 20. The pipe 21 connects with the aerating chamber 1 through a fitting 26 containing a screw down valve and also a valve 27 which is retained on its seat by a spring and the spindle of which projects into the aerating chamber 1 and lies in the path of cams 28 mounted on the shaft 4. The cams 28, on rotation of the shaft 4, contact with the spindle of the valve 27, move it off its seat and thereby place the gas container 13 in communication with the aerating chamber 1 during such time as a cam 28 is in contact with the spindle of the valve 27. The valve 27 is operated twice in each revolution of the shaft 4 and the cams 28 are so disposed that admission of gas to the aerating chamber 1 takes place simultaneously with the discharge of the pump 7. Aeration of the liquid is effected by this arrangement in a better manner than is the case when gas and liquid are introduced separately.

The aerating chamber 1 is connected with the storage chamber 20 by two pipes 29, 30: the pipe 29 is of U-shape in plan view (Fig. 2) and is in connection at one end with the aerating chamber 1 and at its other end with the casing 31 of a back pressure valve mounted on the aerating chamber 1. The pipe 30 is in connection at one end with the valve casing 31, passes through a gland 32 on the closure 25 and terminates within the storage chamber 20.

The back pressure valve 31 is illustrated in Fig. 4 and comprises a tubular and internally cylindrical casing 31 flanged at both ends and divided internally into two portions A, B of different lengths by a partition 132 having a central and circular opening 33. To the flange 34 is secured the flange 35 of a tubular member 36, which is, externally, and internally, of two diameters C, D, the portion C of smaller diameter being screw threaded externally to enable this portion to be screwed into a correspondingly tapped hole in the aerating chamber 1. To the flange 37 is secured the flange 38 of a tubular member 39 connected to the pipe 29. Between the flanges 34, 35 is secured a flexible diaphragm 40 which separates the portion A of the casing 31 from the tubular member 36 and the aerating chamber 1. The portion C of the tubular member 36 contains a hollow plunger 41 which is closed at one end and at its other and open end is flanged. The open flanged end of the plunger 41 is contained in the portion D of the tubular member. The closed end of the plunger projects into the aerating chamber 1 and lies in the path of cams 42 mounted on the shaft 4 by which it is moved inwardly against the action of a spring 46 twice in each revolution of the shaft 4. The cams 42 are so mounted on the shaft 4 that they are inoperative when the cams 28 are operative and gas and liquid are being introduced into the aerating chamber 1. The extent to which the plunger 41 projects into the aerating chamber 1 is regulated by washers placed against the shoulder formed by the junction of the parts C, D of the tubular member 36 and against which the flange on the plunger contacts. 43 is a rod which passes through and is secured to the diaphragm 40. The rod 43 extends at one end into the plunger 41, packing being interposed between the end of the rod and the closed end of the plunger, and at its other end extends through the central opening 33 and enters a piston 44. The portion of the rod 43 that passes through the partition 132 is of different contour to the central opening 33, for example, is of triangular section, so that flow-ways are formed between the wall of the opening and the rod. The piston 44 is cup-shaped, is contained within the portion B of the casing 31 and externally is of different contour to the interior of the casing 31. The piston 44 is shown as hexagonal and flow-ways are thus constituted between the faces of the piston and the wall of the casing. The piston rod 45 enters, at its outer end, the flanged tubular member 39 and is of different contour thereto, for example, is of triangular section, so that flowways are formed between the rod and the wall of the opening. The piston rod 45 is encircled by the spring 46, the ends of which bear against the piston 44 and the member 39. The piston 44 is thus maintained seated on the partition 132 and interrupts the connection of the portions A, B of the casing through the opening 33. The pipe 30 is connected with the portion A of the casing 31 and its connection with the aerating chamber 1 is, as a consequence, controlled by the piston 44, which acts as a valve. The liquid which passes from the aerating chamber 1 through the pipe 29 and portion B of the casing 31, enters the portion A through the flowways between the rod 43 and wall of opening 33 at a high velocity and in an agitated condition. The portion A acts as an expansion chamber in which the turbulence of the liquid is reduced and it is caused to enter the pipe 30 in a more or less quiescent condition.

47 is the snift valve: this valve, which is of the type normally maintained closed by a spring, is located on the aerating chamber 1 in such position that its operating spindle projects towards the inner face of the crank disc 6 on which two diametrically disposed cams 48 are mounted. The snift valve casing is in connection with the interior of the storage chamber 20 by a pipe 49 which passes through a gland 50 on the closure 25. The cams 48, when the shaft 4 is rotated, contact with the spindle of the valve 47 and operate it, thereby placing the interior of the storage chamber 20 in communication with the atmosphere for the period during which a cam 48 is in contact with the spindle of valve 47. When the level of the liquid in the storage chamber 20 rises above the lower end of pipe 49, liquid is discharged from the snift valve 47 when it is opened and this affords an indication or gauge of the height of liquid in the storage chamber 20.

The storage chamber 20 is connected with the bottling means or draught arm (a draught arm is shown) by a pipe 51 which extends from the lower end of the storage chamber 20 and passes through a gland 52 on the closure 25.

The draught arm is of tripartite construction, each part comprising a casing, a non-return valve therein and a valve operating lever. The three casings are arranged side by side and are connected together in manner shown. The first, 53, of the casings is connected at one end to the pipe 51 and at the other end is connected by a pipe 54 with the upper end of a secondary storage chamber 55. The second, 56, of the casings is connected at one end by a pipe 57 with the lower end of the secondary storage chamber 55 and at the other end with a delivery jet 58. The third, 59, of the casings is connected at one end by a small pipe 60, which extends centrally up the pipe 54, with the upper end of the secondary storage chamber 55 and at the other end with the atmosphere. The three casings and non-return valves are of like construction, but the casing 59 is smaller than the casings 53, 56 as it has to deal solely with gas and air.

The construction of the casings 53, 56, 59 with non-return valves is illustrated in Fig. 5. Each casing comprises two portions 61, 62 of different diameters separated from one another by an integral partition 65 with a central circular opening 66. The portion 62 is closed by a tubular member 67 the opening through which is circular in section, by which the casing is connected with the pipe 51, 57 or 60. The portion 61 contains a cup shaped piston 68 externally of a different contour to the internal contour of the portion 61: the piston 68 is shown as hexagonal. Flowways are thus formed between the inner wall of the portion 61 and the faces of the piston 68. The piston 68 is normally seated on the partition 65 and constitutes a valve. The free end of the piston rod 69 enters the circular opening in the member 67 and is of a different contour thereto, for example, is of triangular section so that flowways are formed between the wall of the opening and the piston rod. The portion 62 is closed by the screwed plug 70 which also serves to clamp in position a diaphragm 71. A spindle 72 passes through the screwed plug 70, the diaphragm 71 to which it is connected, and the central circular opening 66 and enters the piston 68. The contour of the portion of the spindle 72 that passes through the partition 65 is other than circular, for example, it may be triangular, so as to form flowways between the wall of the opening and the faces of the spindle or rod 72. The outer end of the spindle 72 carries a cap 73, adjustable as to position. The portion 62 has an opening through its lower portion through which connection is made, in the case of casing 53, with the secondary storage chamber 55, in the case of casing 56, with the delivery jet 58 and in the case of casing 59, with the atmosphere.

The operating levers 74, 75, 76 of the valves just described are independently mounted on a rod 77 mounted in a frame 78. Each lever is in one with or attached to a cam 79 which is of such contour that when a lever is pushed forwardly, the cam acts on and moves inwardly a spindle 72 and moves a valve 68 from its seating on the partition 65.

The operation of the apparatus is as follows:—The handle 5 is grasped and the shaft 4 rotated thereby thus operating the pump 7. Liquid is, as a consequence, discharged into the aerating chamber 1 and meets therein gas which is admitted during the discharge of liquid by the opening of the valve 27 by the cams 28. The gas in its passage from the gas container 13 to the valve 27 passes through the coil 19, and expands therein. As soon as the level of the aerated liquid in the aerating chamber 1 reaches the pipe 29, it passes therethrough on the opening of the valve 44 by the cams 42 into the storage chamber 20 in which it undergoes a cooling action owing to the expansion of the gas flowing through the coil 19. Aerated liquid is allowed to pass from the storage chamber 20 to the secondary storage chamber 55 by operation of the lever 74, which opens the valve 68. The aerated liquid in the secondary storage chamber 55 is withdrawable by operation of the lever 75, and may be withdrawn under full pressure, in which case the liquid will foam or froth as it enters the glass, or under reduced pressure. The withdrawal under reduced pressure is effected by operation of the lever 76 prior to the lever 75, thereby releasing gas in the upper part of the secondary storage chamber.

The levers 75, 76 may, in some circumstances, be operated simultaneously and in other circumstances the levers 74, 76, or 74, 75, 76 may be operated simultaneously.

What I claim is:—

1. In apparatus for aerating liquids, a liquid aerating chamber and means for separately and simultaneously introducing liquid and gas into said chamber in the required proportions, comprising liquid and gas valves discharging into the chamber, and cams for controlling and simultaneously opening the said liquid and gas valves, respectively.

2. In apparatus for aerating liquids, a liquid aerating chamber, means for separately and simultaneously introducing gas and liquid into said chamber, an aerated liquid storage chamber, and means for cooling aerated liquid in said storage chamber by expanding the gas before introduction into said liquid aerating chamber.

3. In apparatus for aerating liquids, a liquid aerating chamber, an aerated liquid storage chamber, means for discharging liquid into said liquid aerating chamber, means for introducing gas into said liquid aerating chamber, and the said gas introducing means including a coil mounted in said storage chamber for the expansion of gas passing therethrough to the liquid aerating chamber to cool the liquid in said storage chamber.

4. In apparatus for aerating liquids, a liquid aerating chamber, means for separately and simultaneously introducing liquid and gas into said chamber, aerated liquid delivery means including an aerated liquid storage chamber, and a coil mounted in said storage chamber and connected with said liquid and gas delivery means whereby gas passing therethrough before introduction into said aerating chamber is expanded and cools the liquid in said storage chamber.

5. In apparatus for aerating liquids, a liquid aerating chamber, means for discharging liquid therein, an aerated liquid storage chamber in communication with said aerating chamber, and means for discharging gas into said liquid aerating chamber from a source of gas supply, the said means including a coil mounted in said storage chamber for the expansion of gas passing through said coil to cool the liquid in said storage chamber.

6. In apparatus for aerating liquids, the combination with a liquid aerating chamber and aerated liquid storage chamber, of means for introducing gas into said liquid aerating chamber, and including means within said liquid storage chamber for expanding the gas before introduction into said aerating chamber to cool the liquid in said storage chamber.

7. In apparatus for aerating liquids, the combination with a liquid aerating chamber and an aerated liquid chamber in communication therewith, of means for introducing gas into said liquid aerating chamber, the said means including a coil mounted in said storage chamber and connected with a source of gas supply and with said aerating chamber, respectively, to cause expansion of gas passing therethrough to cool the liquid in said storage chamber.

8. In apparatus for aerating liquid, a liquid aerating chamber, a combined aerated liquid storage and cooling chamber in communication therewith, means for introducing gas into said aerating chamber including a gas line from a source of gas supply passing through said storage chamber, and means mounted in said storage chamber and connected in said gas line for expanding gases passing therethrough before introduction into said aerating chamber whereby the liquid in the storage chamber is cooled.

9. In apparatus for aerating liquid, a liquid aerating chamber, an aerated liquid storage and cooling chamber in communication with said aerating chamber, and a secondary storage chamber in connection with said storage and cooling chamber, the said secondary storage chamber adapted to be connected with dispensing apparatus for discharge of aerated liquid therefrom.

10. In apparatus for aerating liquid, a liquid aerating chamber, an aerated liquid storage and cooling chamber in communication with said aerating chamber, and a secondary storage chamber connected with said storage and cooling chamber, the said secondary chamber provided with separate and independently operable gas and liquid discharges, respectively.

11. In apparatus for aerating liquids, a liquid aerating chamber, means for supplying and discharging liquid into said chamber, and means controlled by said liquid supplying means for simultaneously discharging gas into said chamber during discharge of liquid therein.

12. In apparatus for aerating liquids, a liquid aerating chamber, means for supplying and discharging liquid into said chamber including a pump and a discharge valve in said chamber, means for discharging gas into said chamber, and means for controlling and simultaneously operating said liquid discharge valve and said gas discharging means.

13. In apparatus for aerating liquids, a liquid aerating chamber, a liquid intake valve in said chamber, a pump connected with said intake valve for discharging liquid therethrough into said chamber, a normally closed gas intake valve discharging into said chamber, and means for opening said gas intake valve simultaneously with the opening of said liquid intake valve.

14. In apparatus for aerating liquids, a liquid aerating chamber, a pump connected with said chamber for discharging liquid thereinto, operating mechanism for said pump, and means for discharging gas into said chamber simultaneously with the discharge of liquid thereinto, the said gas discharging means controlled by said pump operating mechanism.

15. In apparatus for aerating liquids, a liquid aerating chamber, means for discharging liquid into said chamber, operating mechanism for said liquid discharging means, a normally closed valve in said chamber connected with a source of gas supply, and means within said chamber operated and controlled by the operating mechanism for said liquid discharge means for opening said valve during discharge of liquid into said chamber.

16. In apparatus for aerating liquids, a liquid aerating chamber, means for discharging liquid into said chamber, operating mechanism for said liquid discharging means, a normally closed valve in said chamber connected with a source of gas supply, and a cam controlled by said liquid discharging means operating mechanism for opening said valve during discharge of liquid into said chamber.

17. In apparatus for aerating liquids, a liquid aerating chamber, means for discharging liquid into said chamber, operating mechanism for said liquid discharging means, means for discharging gas into said chamber simultaneously with a discharge of liquid thereinto, and means for discharging aerated liquid from said chamber, the said aerated liquid discharge means operative only during non-operation of said liquid and said gas discharging means.

18. In apparatus for aerating liquids, a liquid aerating chamber, means for discharging liquid into said chamber, operating mechanism for said liquid discharge means, a normally closed gas inlet valve in said chamber connected with a gas supply, a normally closed aerated liquid discharge valve in said chamber, and means operated and controlled by said liquid discharge means operating mechanism for opening said gas inlet valve simultaneously with and during discharge of liquid into said chamber, and for opening said aerated liquid discharge valve during non-operation of said liquid discharge means and closure of said gas inlet valve.

Dated this 18th day of August, 1921.

A. J. BILLOWS.